US007106820B2

(12) United States Patent
Morris (10) Patent No.: US 7,106,820 B2
(45) Date of Patent: Sep. 12, 2006

(54) SYSTEM AND METHOD FOR ESTABLISHING WORD SYNCHRONIZATION (75) Inventor: Martin Morris, Vista, CA (US)

(73) Assignee: Broadcom Corporation, Irvine, CA (US)

(*) Notice: Subject to any disclaimer, the term of this patent is extended or adjusted under 35 U.S.C. 154(b) by 916 days.

(21) Appl. No.: 09/832,435

(22) Filed: Apr. 10, 2001

(65) Prior Publication Data
US 2002/0146085 A1 Oct. 10, 2002

(51) Int. Cl.
H04L 25/38 (2006.01)
(52) U.S. Cl. ............. 375/365; 375/371; 375/354; 714/785; 714/793; 370/503
(58) Field of Classification Search .......... 375/365, 375/371, 366, 368, 372; 714/781, 785, 793; 370/503, 516, 518, 513, 514
See application file for complete search history.

(56) References Cited

U.S. PATENT DOCUMENTS

| 4,405,829 | A | | 9/1983 | Rivest et al. |
|---|---|---|---|---|
| 4,737,954 | A | * | 4/1988 | Smedley ............... 370/522 |
| 4,959,834 | A | * | 9/1990 | Aikawa et al. ......... 714/798 |
| 5,086,429 | A | * | 2/1992 | Gray et al. ............. 714/13 |
| 5,214,669 | A | * | 5/1993 | Zarembowitch .......... 375/130 |
| 5,231,638 | A | * | 7/1993 | Fujiki ................. 714/765 |
| 5,430,740 | A | | 7/1995 | Kivari et al. |
| 5,490,139 | A | | 2/1996 | Baker et al. |
| 5,572,528 | A | | 11/1996 | Shuen |
| 5,636,216 | A | | 6/1997 | Fox et al. |
| 5,652,751 | A | | 7/1997 | Sharony |
| 5,696,903 | A | | 12/1997 | Mahany |
| 5,699,353 | A | | 12/1997 | Kent |
| 5,708,655 | A | | 1/1998 | Toth et al. |
| 5,742,598 | A | | 4/1998 | Dunn et al. |
| 5,754,547 | A | | 5/1998 | Nakazawa |
| 5,784,012 | A | * | 7/1998 | Kawauchi et al. ........ 341/67 |
| 5,812,531 | A | | 9/1998 | Cheung et al. |
| 5,812,564 | A | | 9/1998 | Bonke et al. |
| 5,825,772 | A | | 10/1998 | Dobbins et al. |
| 5,832,021 | A | * | 11/1998 | Kondo ................ 375/150 |

(Continued)

FOREIGN PATENT DOCUMENTS

EP 0695059 A1 1/1996

(Continued)

OTHER PUBLICATIONS

Haartsen, Jaap, "Bluetooth-The universal radio interface for *ad hoc*, wireless connectivity," *Ericsson Review*, No. 3, pp. 110-117, (1998).

(Continued)

Primary Examiner—Jean B. Corrielus
(74) Attorney, Agent, or Firm—McAndrews, Held & Malloy, Ltd.

(57) ABSTRACT

A phase synchronizer may operate, for example, to establish synchronization with a phase of a received codeword. The phase synchronizer may include, for example, an input shift register, a first syndrome computing module, a first error detection module, a second syndrome computing module, a second error detection module and a comparator arrangement. The first syndrome computing module may compute syndromes relating to a first potential phase of the codeword. The first error detection module may determine, based upon the first syndromes, a first number of errors associated with the first potential phase of the codeword. The second syndrome computing module may compute syndromes relating to a second potential phase of the codeword. The second error detection module may determine, based upon the second syndromes, a second number of errors associated with the second potential phase of the codeword.

23 Claims, 7 Drawing Sheets

U.S. PATENT DOCUMENTS

| | | | |
|---|---|---|---|
| 5,835,061 A | 11/1998 | Stewart | |
| 5,844,918 A | 12/1998 | Kato | |
| 5,845,081 A | 12/1998 | Rangarajan et al. | |
| 5,850,592 A | 12/1998 | Ramanathan | |
| 5,854,899 A | 12/1998 | Callon et al. | |
| 5,867,510 A | 2/1999 | Steele | |
| 5,929,793 A * | 7/1999 | Choi | 341/67 |
| 5,982,294 A | 11/1999 | Takayama et al. | |
| 5,983,098 A | 11/1999 | Gerszberg et al. | |
| 6,005,903 A * | 12/1999 | Mendelovicz | 375/367 |
| 6,029,264 A | 2/2000 | Kobayashi et al. | |
| 6,052,812 A | 4/2000 | Chen et al. | |
| 6,363,107 B1 * | 3/2002 | Scott | 375/150 |
| 6,510,248 B1 * | 1/2003 | Hsieh | 382/233 |
| 6,535,566 B1 * | 3/2003 | Tamamura et al. | 375/371 |
| 6,587,500 B1 * | 7/2003 | Persson et al. | 375/142 |

FOREIGN PATENT DOCUMENTS

| | | |
|---|---|---|
| WO | WO 99/14897 A2 | 3/1999 |

OTHER PUBLICATIONS

"PMDF System Manager's Guide PMDF-Ref-5.1," http://www.geneseo.edu/pmdf/sysman/book_1.html#chapter_1 , (Mar. 16, 1999).

"Specification of the Bluetooth System, Core, Version 1.0B," *Bluetooth SIG Specifications*, pp. 18-42, (Dec. 1, 1999).

Costello, Daniel J., Shu, Lin, "Error Control Coding", pp. 141-222, (Oct. 1982) Prentice-Hall.

* cited by examiner

SYSTEM AND METHOD FOR ESTABLISHING WORD SYNCHRONIZATION

FIELD OF THE INVENTION

The present invention generally pertains to wireless networks, and more particularly to methods for establishing timing synchronization within such networks.

BACKGROUND OF THE INVENTION

Computer networks allow multiple computers, peripherals and other information storage, retrieval or processing devices to share data. Each device attached to a network is typically referred to as a node on the network, or a node that is part of the network. Local Area Networks ("LANs") have historically consisted of nodes interconnected by physical telecommunications media (eg, coaxial cable, twisted pair wire, or fiber optics). Recently wireless LANs, the nodes of which are not connected by means of a physical medium, have started to appear in the market. These wireless LANs communicate by means of infra-red (IR), radio or other short-range signals. One of the benefits of using wireless LANs is that cabling is not required. This is a particularly useful feature for mobile nodes such as laptop and notebook computers, PDAs (personal digital assistants), and the like. If appropriately equipped with an appropriate wireless adapter, the mobile nodes can move around within a predefined coverage area and remain connected to the network.

Certain short-range wireless networks predicated on the proposed "Bluetooth" wireless communications protocol are currently being developed. This protocol contemplates the grouping of physically proximate wireless nodes into "piconets". In Bluetooth networks, each encoded message packet sent from a transmitting device incorporates an access code specifying an address of a receiving device. The access code is also used to effect timing synchronization in the receiving device. The Bluetooth access code consists of a 4-bit preamble, a 64-bit sync word, and a 4-bit trailer. Since the preamble and trailer are relatively short, a receiving device may not be able to consistently use them to acquire proper timing information. For example, noise in the communication channel could lead to a bit shift, which would preclude decoding of the message information included within the received packet.

A conventional approach to acquiring timing information from similarly encoded packets is to effect a sliding correlation using the sync word. In this approach the sync word within each received packet is correlated with the access code of a target packet pre-loaded within a correlator of the receiving device. The sync word contemplated by the Bluetooth protocol is generated by prepending parity bits to the address of the receiving device so as to form a BCH (Bose, Chaushuri, Hocquenghem) code block not easily mistaken for another. The preamble, sync word and trailer of the Bluetooth access code collectively yield favorable autocorrelation properties, thereby making the access code useful for timing synchronization.

A Unfortunately, in certain applications it is desirable to receive subsequent packets containing any of a number of potential access codes. Use of the conventional synchronization approach described above would require multiple correlators (i.e., one per potential access code). Since in many applications a large number of access codes may be possible, this approach will often be infeasible. Accordingly, a need exists for a method of acquiring device address and timing synchronization information from encoded data packets which does not require a priori knowledge of potential access codes.

SUMMARY OF THE INVENTION

In summary, the present invention relates to a phase synchronizer having an input shift register for receiving a sequence of bits containing a codeword. The phase synchronizer includes a first syndrome computing module, operatively coupled to the input shift register, for computing first syndromes relating to a first potential phase of the codeword. A first error detection module determines, based upon the first syndromes, a first number of errors associated with the first potential phase of the codeword. A second syndrome computing module, operatively coupled to the input shift register, computes second syndromes relating to a second potential phase of the codeword. The second syndrome computing module provides the second syndromes to a second error detection module, which determines a second number of errors associated with the second potential phase of the codeword. A comparator arrangement is provided for comparing the first number of errors and the second number of errors to a threshold value. The comparator arrangement determines that the first potential phase corresponds to a valid codeword phase when the first number of errors is less than the threshold value. Similarly, the second potential phase is determined to correspond to a valid codeword phase when the second number of errors is less than the threshold value.

The present invention also provides for a codeword synchronization system containing a plurality of phase synchronizers. Each of the phase synchronizers is commonly connected to an input shift register, which is disposed to receive a sequence of bits containing a codeword. Each phase synchronizer is associated with a different potential phase of the codeword, and includes a syndrome computing module for computing syndromes associated with one such potential phase. An error detection module within each phase synchronizer determines a number of errors associated with the applicable potential phase using the syndromes produced by the corresponding syndrome computing module. Each phase synchronizer further includes a comparator for determining whether less than a predetermined number of errors have been identified by the synchronizer's error detection module. The phase synchronizers are configured such that only one will indicate that less than the predetermined number of errors have been so identified, thereby enabling synchronization with the phase of the received codeword.

In another aspect, the present invention comprises a codeword synchronization system operative to concurrently effect clock recovery and codeword synchronization. The codeword synchronization system includes a sampling arrangement for generating N bitstreams in response to a received data stream. The synchronization system further includes a set of N codeword synchronization modules, each of which provide a plurality of codeword error signals indicative of a number of errors associated with a corresponding plurality of potential phases of one of the N bitstreams. A phase selection module selects the one of the codeword error signals indicative of a lowest number of errors, thereby identifying the one of the potential phases corresponding to a valid codeword phase.

DETAILED DESCRIPTION OF THE INVENTION

The present invention is more fully described with reference to FIGS. 1–8. An exemplary implementation of the invention is discussed and illustrated with reference to its implementation using wireless networks predicated on the proposed "Bluetooth" wireless communications protocol. This protocol is described in *Specification of the Bluetooth System*, v0.8, Jan. 22, 1999 (and in subsequent revisions thereof). It should be understood that this invention is not limited to such a wireless protocol, and could be similarly implemented using other types of wireless networks.

Figure 1:
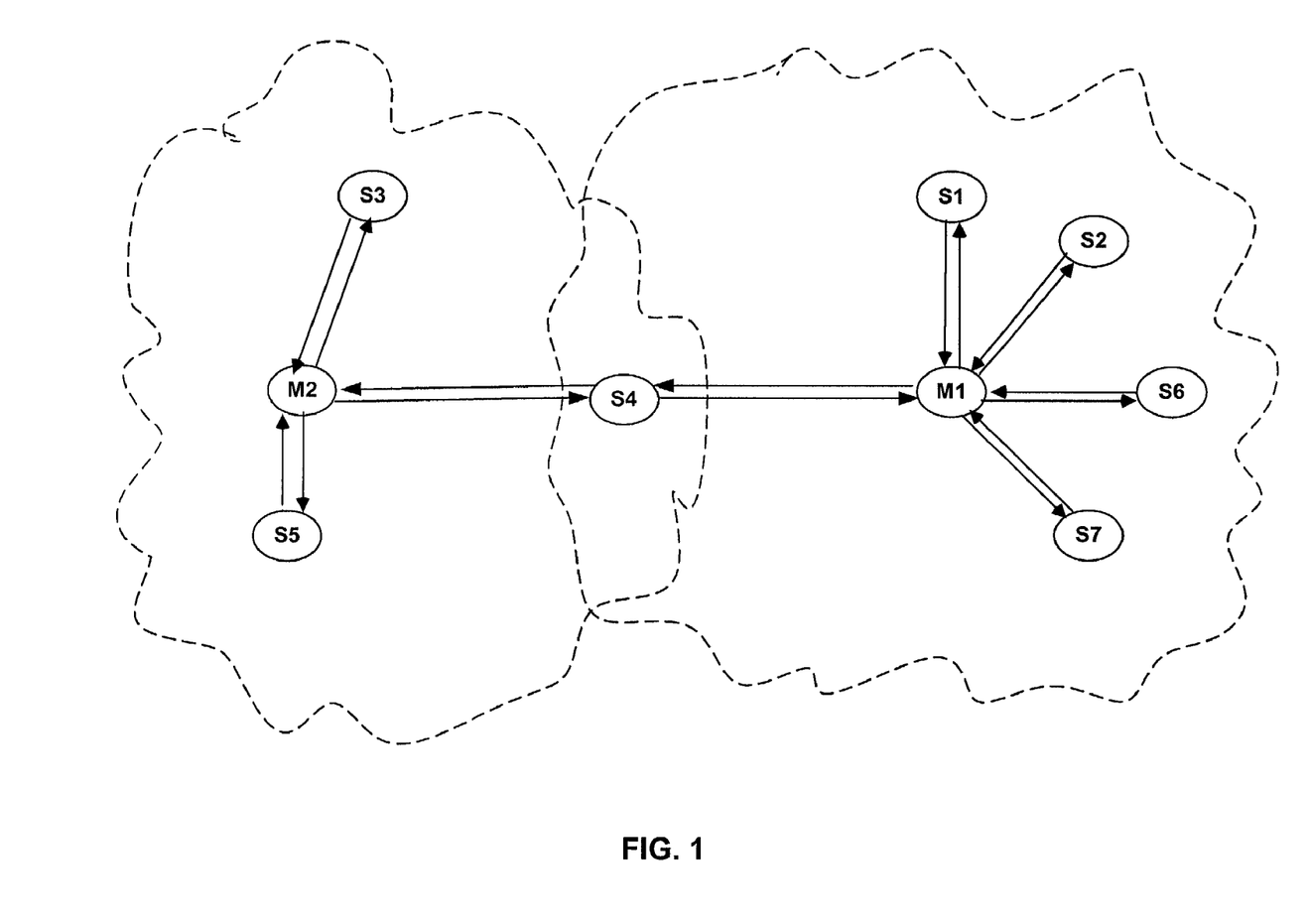
FIG. 1 illustrates a plurality of wireless nodes included within first and second piconets.

FIG. 1 illustrates a plurality of wireless nodes included within an exemplary Bluetooth wireless network comprised of a first piconet 10 and a second piconet 20. The first piconet 10 is comprised of a master node M1, and of slave nodes S1, S2, S4, S6 and S7. The second piconet 20 contains a master node M2, and slave nodes S3, S4 and S5. For purposes of illustration, it is assumed that certain of the wireless nodes depicted in FIG. 1 are mobile relative to one another. In the piconet architecture of FIG. 1, each slave node within the first piconet 10 is within the coverage area of master node Ml and each slave node within the second piconet 20 is within the coverage area of master node M2. However, slave nodes within the first and second piconets 10 and 20 need not be within transmission range of other slave nodes within their respective networks.

As was discussed in the Background of the Invention, each encoded Bluetooth message packet sent from a transmitting device (e.g., master node M1) incorporates an access code specifying an address of a receiving device (e.g., slave node S1). Again, the Bluetooth access code consists of a 4-bit preamble, a 64-bit sync word, and a 4-bit trailer, which individually or collectively provide timing information. In accordance with the present invention, timing and device address information is derived in real-time from the sync word within Bluetooth or other message packets without a priori knowledge of the access code.

Figure 2:
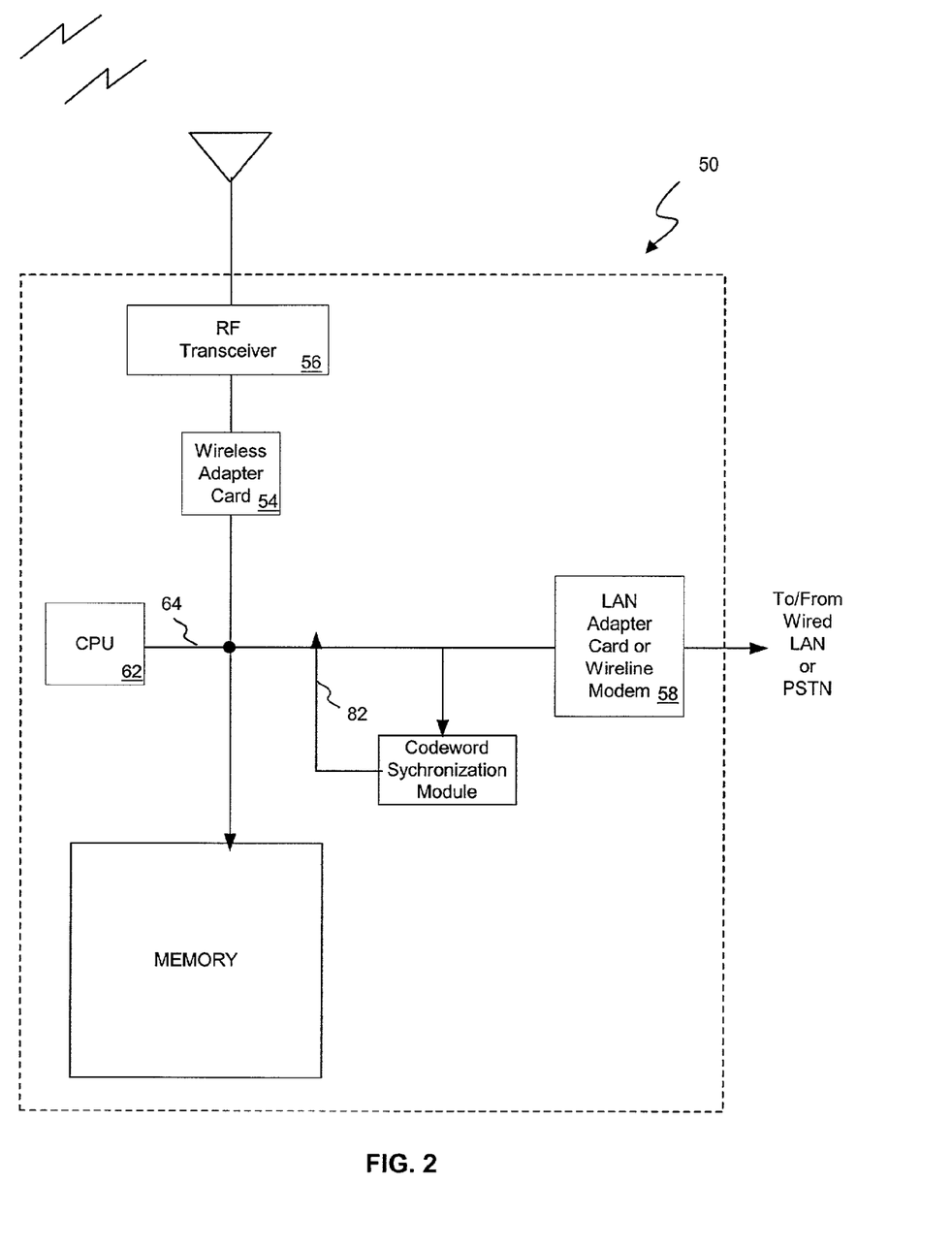
FIG. 2 is a block diagram illustratively representing the components of a wireless node incorporating a codeword synchronization module of the present invention.

FIG. 2 is a block diagram illustratively representing the components of a wireless node 50 incorporating a codeword synchronization module 52 of the present invention. In a preferred implementation each wireless node 50 is capable of being configured for operation as either a master node or a slave node. Referring to FIG. 2, the wireless node 50 may be in the form of an electronic device (e.g., a laptop or desktop computer, hand-held electronic organizer, or printer) containing a wireless adapter card 54 and an RF transceiver 56 disposed for communication in accordance with a predefined network communication standard. The wireless node 50 may also include a LAN adapter card 58 for facilitating communication with a wired LAN, or alternately a wireline modem for effecting communication through the PSTN. The wireless adapter card 54 and RF transceiver 56 are controlled by a CPU 62 operative to execute program instructions of various software routines stored in memory 60. The components of the wireless node 50 are seen to be communicatively coupled via system bus 64.

Figure 3:
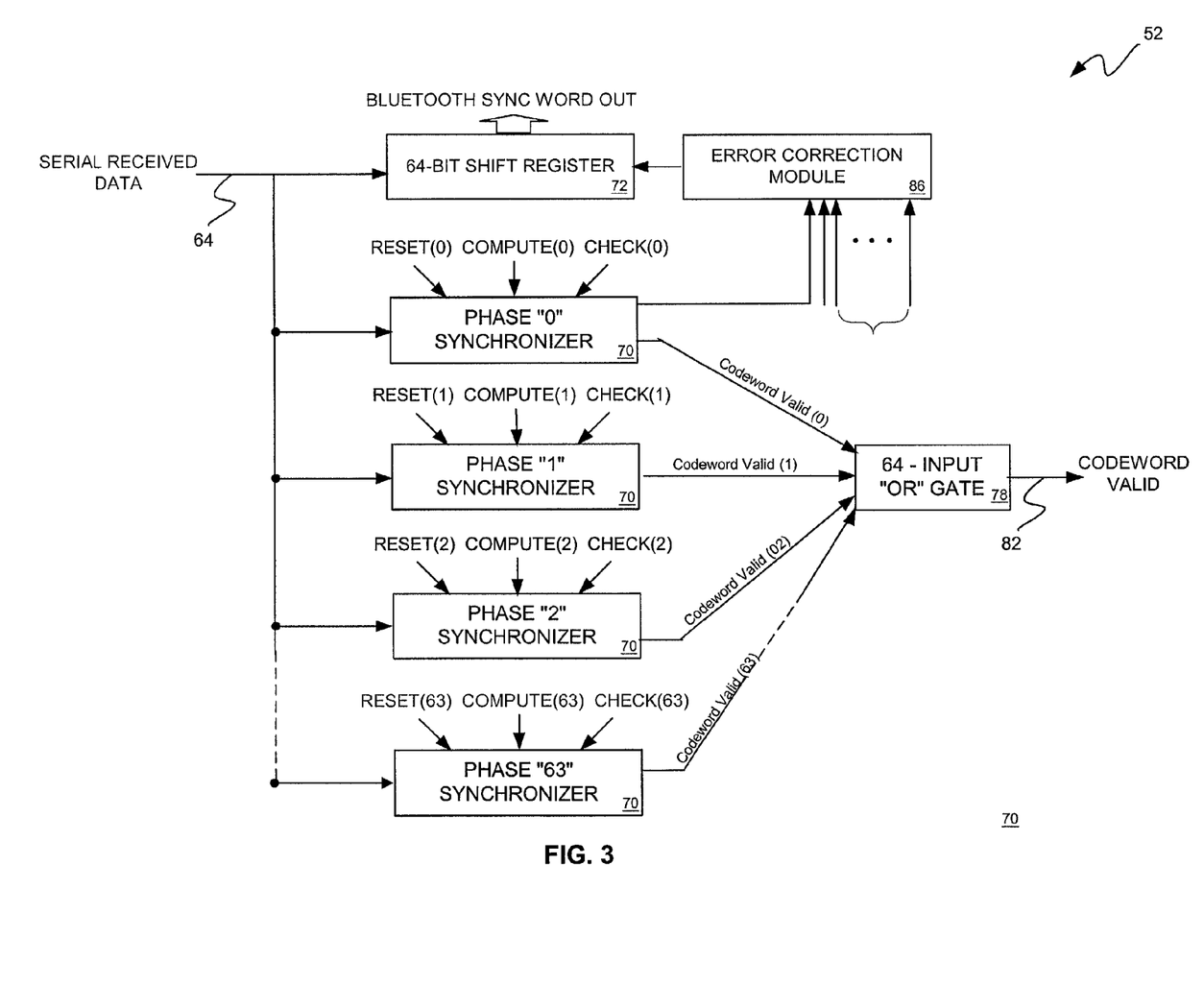
FIG. 3 depicts the components included within an exemplary implementation of the codeword synchronization module.

FIG. 3 depicts the components included within an exemplary implementation of the codeword synchronization module 52, which is disposed to process packet data serially received from wireless adapter card 54 via system bus 64. The serially received data is provided to each of a set of sixty four phase synchronizers 70 and to a 64-bit shift register 72. Each phase synchronizer 70 is associated with a unique potential codeword phase, and is configured to issue a Codeword Valid signal upon detecting that a valid 64-bit sync word of a Bluetooth access code of such phase has been received. Specifically, each phase synchronizer 70 examines a different 64-bit sequence of the serially received data (i.e., a different potential codeword phase) in an effort to determine whether such sequence corresponds to a valid codeword in the manner described hereinafter. For example, if the phase "0" synchronizer 70 examines received bits K through K+63, then the phase "1" synchronizer 70 would examine received bits K+1 through K+64, the phase "2" synchronizer 70 would evaluate received bits K+2 through K+65, and so on. In this way the sixty four phase synchronizers 70 collectively serve as a type of sliding correlator for the unknown bit pattern of the received Bluetooth sync word.

Referring to FIG. 3, a set of sixty four Codeword Valid lines 74 associated with the sixty four synchronizers 70 are provided to a 64-input OR gate 78. As is discussed below, the sixty four phase synchronizers 70 are enabled and clocked such that only one synchronizer 70 provides an indication to the 64-input OR gate 78 of the number of codeword errors existing in the sixty four bits within shift register 72 during any given clock cycle. A Codeword Valid indication is provided on output line 82 by OR gate 78 when the sixty four bits most recently received by the codeword synchronization module 52 correspond to a valid or correctable 64-bit Bluetooth sync word. Once a Codeword Valid indication has been provided, timing information derived from the valid or correctable Bluetooth sync word may be used to receive the remainder of the encoded Bluetooth message packet being received over system bus 64. It is not necessary that any errors present within the registered Bluetooth sync word be corrected prior to extraction of such timing information. Rather, such errors may be corrected as described below by an error correction module 86 contemporaneously with receipt of the remainder of the applicable encoded Bluetooth message packet.

The implementation of the codeword synchronization module 52 described herein is at least partially predicated on the error correction properties of BCH codes. In particular, up to six errors can exist within a given 64-bit BCH codeword without risking confusion of such codeword with another. Furthermore, since each 64-bit BCH codeword forming a Bluetooth sync word includes 34 parity bits, 6 extension bits and 24 device address bits, only $2^{24}$ out of $2^{64}$ possible values represent valid sync words. A correctable BCH codeword therefore may be used to provide a robust indication of both device address and burst timing. Each of the phase synchronizers 70 is disposed to determine whether less than seven BCH codeword errors are associated with a different potential codeword phase (i.e., with a different 64-bit sequence of received data bits). When less than seven errors are detected in any of such 64-bit sequences, the applicable phase synchronizer produces a Codeword Valid signal.

A number of methods exist for locating and correcting errors in BCH codewords. Many of these methods contemplate a three-step process for determining the bits in error, if any, within such codewords (See, e.g., S. Lin and D. J. Costello, Jr., *Error Control Coding: Fundamentals and Applications*, Prentice-Hall, 1983. pp. 151–160). In a first step a set of equations, or "syndromes", whose solutions provide the locations of any codeword errors are computed from the serially-received data potentially corresponding to a codeword. The second step involves determining an error location polynomial ("ELP"), the mathematical order of which corresponds to the number of errors in the potential codeword. As mentioned above, a 64 bit BCH codeword is correctable if the order of the ELP is six or less. In the third step of the process the ELP is solved for the actual locations of the bit errors within the potential codeword. The detection of errors in BCH codewords is also described in, for example, U.S. Pat. No. 5,687,510, U.S. Pat. No. 5,892,294, U.S. Pat. No. 5,430,740 and U.S. Pat. No. 6,052,812, the specifications of which are hereby incorporated by reference.

Figure 4:
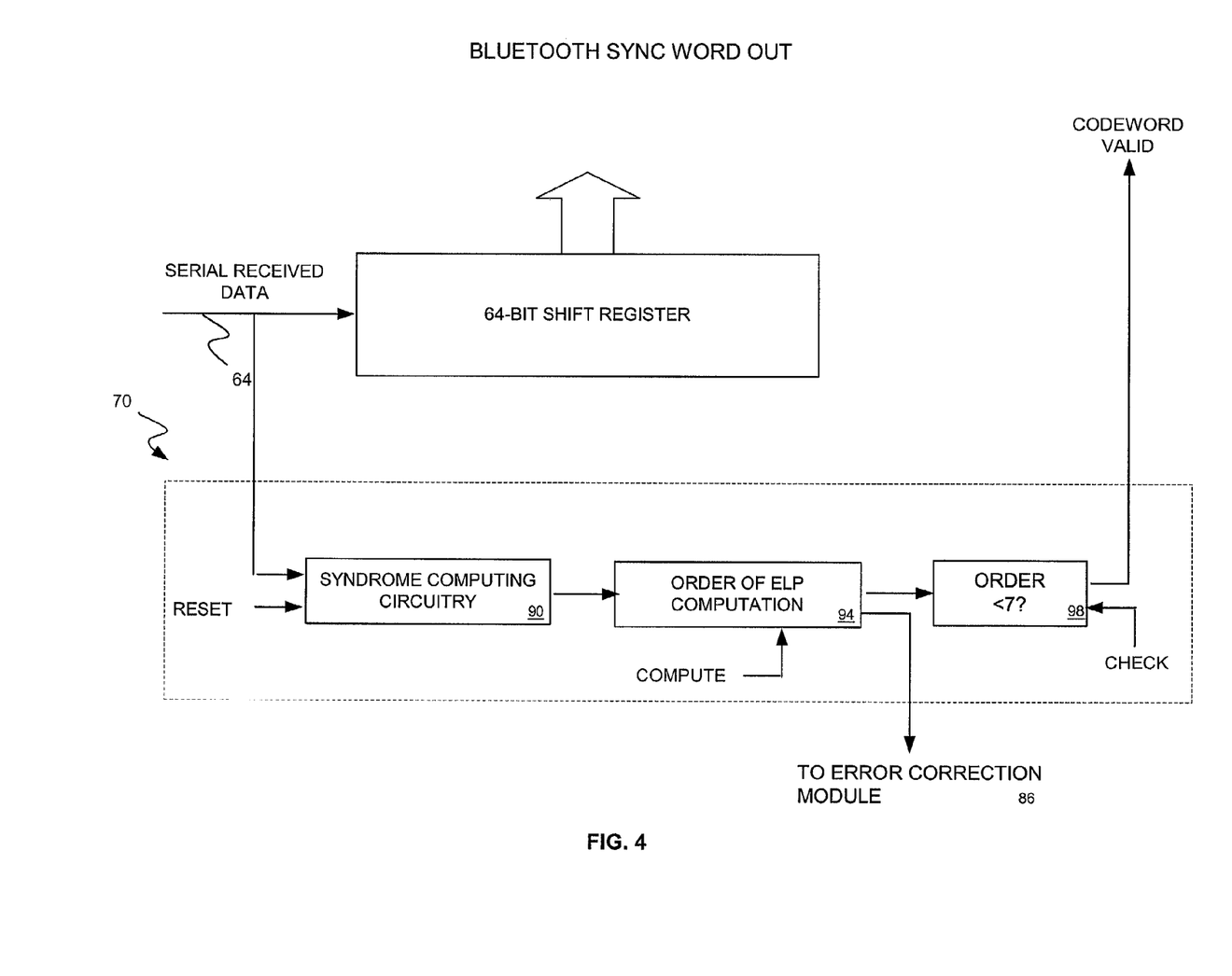
FIG. 4 provides a block diagram representation of a preferred implementation of a phase synchronizer included within the codeword synchronization module.

Turning now to FIG. 4, an illustrative representation is provided of a preferred implementation of a phase synchronizer 70. As is indicated by FIG. 4, the received serial data provided to the 64-bit shift register 72 is also provided to syndrome computing circuitry 90. Computation of syndromes within the syndrome computing circuitry 90 is completed every sixty four cycles of the clock signal recovered from the received serial data by a clock recovery circuit (not shown). This is indicated by the timing diagram of FIG. 5, which shows that the syndrome computing circuitry 90 is Reset once every sixty four clock cycles.

The syndrome computing circuitry 90 employs conventional techniques to compute syndromes using hardware (e.g., feedback shift registers, or "FSRs"), or using computation algorithms implemented in software syndromes (see, e.g., Lin and Costello, pp. 167–170). For a 64-bit BCH code, twelve syndromes are required to be computed. If a hardware implementation is employed, it has been shown that at most six FSRs are needed to generate the twelve required. In such a hardware implementation a set of six FSRs and twelve syndrome registers are conventionally arranged to process the received serial data. After 64 bit times, such syndrome registers contain the syndromes corresponding to the contents of the 64-bit shift register 72.

Figure 5:
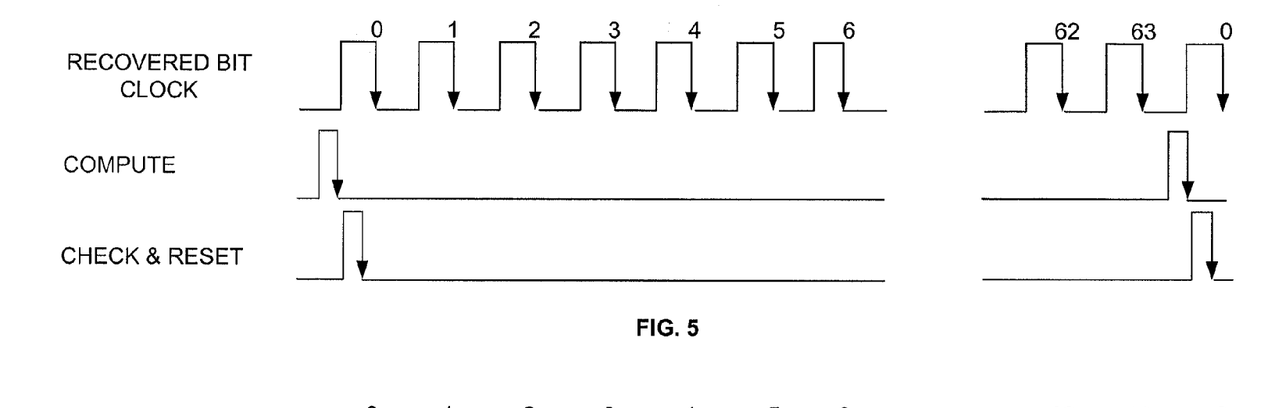
FIG. 5 is a timing diagram illustrating the operation of a single phase synchronizer included within a codeword synchronization module.

FIG. 5 is a timing diagram illustrating the operation of a single phase synchronizer 70 included within the codeword synchronization module 52. As is indicated by FIG. 5, before the Reset signal is applied to the syndrome computing circuitry 90, a Compute signal is applied to an order of ELP computation module 94. The order of ELP computation module 94 can be implemented in either hardware or software, and exemplary hardware implementations are described in Lin and Costello, supra. The Compute signal enables the module 94 to compute the order of the ELP corresponding to the syndromes currently registered by the syndrome computing circuitry 90. As is indicated by FIG. 5, the Reset signal is applied to the syndrome computing circuitry 90 and the Check signal is applied to comparator 98 on the trailing edge of the Compute signal.

Figure 6:
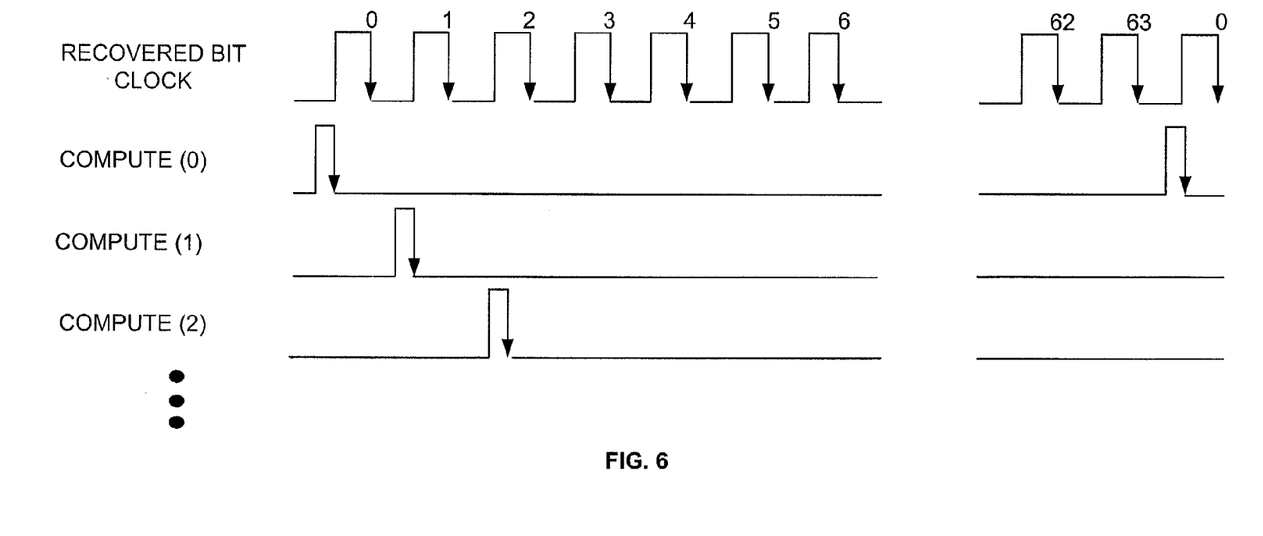
FIG. 6 is a timing diagram representative of the timing relationship between the phase synchronizers of a codeword synchronization module.

Turning now to FIG. 6, a timing diagram is provided which is representative of the timing relationship existing among the Compute signals applied to the various phase synchronizers 70 of the codeword synchronization module 52. As is indicated by FIG. 6, a different order of ELP computation module 94 is enabled during each clock phase. Within each computation module 94, the order of the ELP is compared to the integer "7" by a comparator 98 during the applicable clock phase. The applicable comparator 98 is enabled to perform this comparison by a Check signal, which is applied contemporaneously with the Reset signal to the phase synchronizer 70 containing such comparator 98. If the order of the ELP is determined to be less than seven, then the 64 bits currently stored in the shift register 72 are deemed to correspond to a valid or correctable Bluetooth sync word. In this case the ELP is read from the order of ELP computation module 94 and used by the error correction module 86 to correct the appropriate bits within shift register 72. After such correction, the bits within the shift register 72 constitute a valid Bluetooth sync word and a Codeword Valid signal is impressed upon line 74. As mentioned above, it is unnecessary to correct any errors within the shift register 72 in order to acquire access code timing information. Rather, such correction need be undertaken by error conversion module 86 only if it is desired to determine the correct device address embedded within the Bluetooth sync word.

As mentioned above, the codeword synchronization module 52 of FIG. 3 is responsive to a clock signal derived from the received serial data by a clock recovery circuit (not shown). In accordance with another aspect of the invention, the codeword synchronization system 100 enhances efficiency by utilizing a plurality of codeword synchronization modules to recover this clock signal during the process of codeword synchronization. This aspect of the present invention is highlighted by FIG. 7, which provides a block diagram representative of a codeword synchronization system 100 operative to concurrently effect clock recovery and codeword synchronization.

Figure 7:
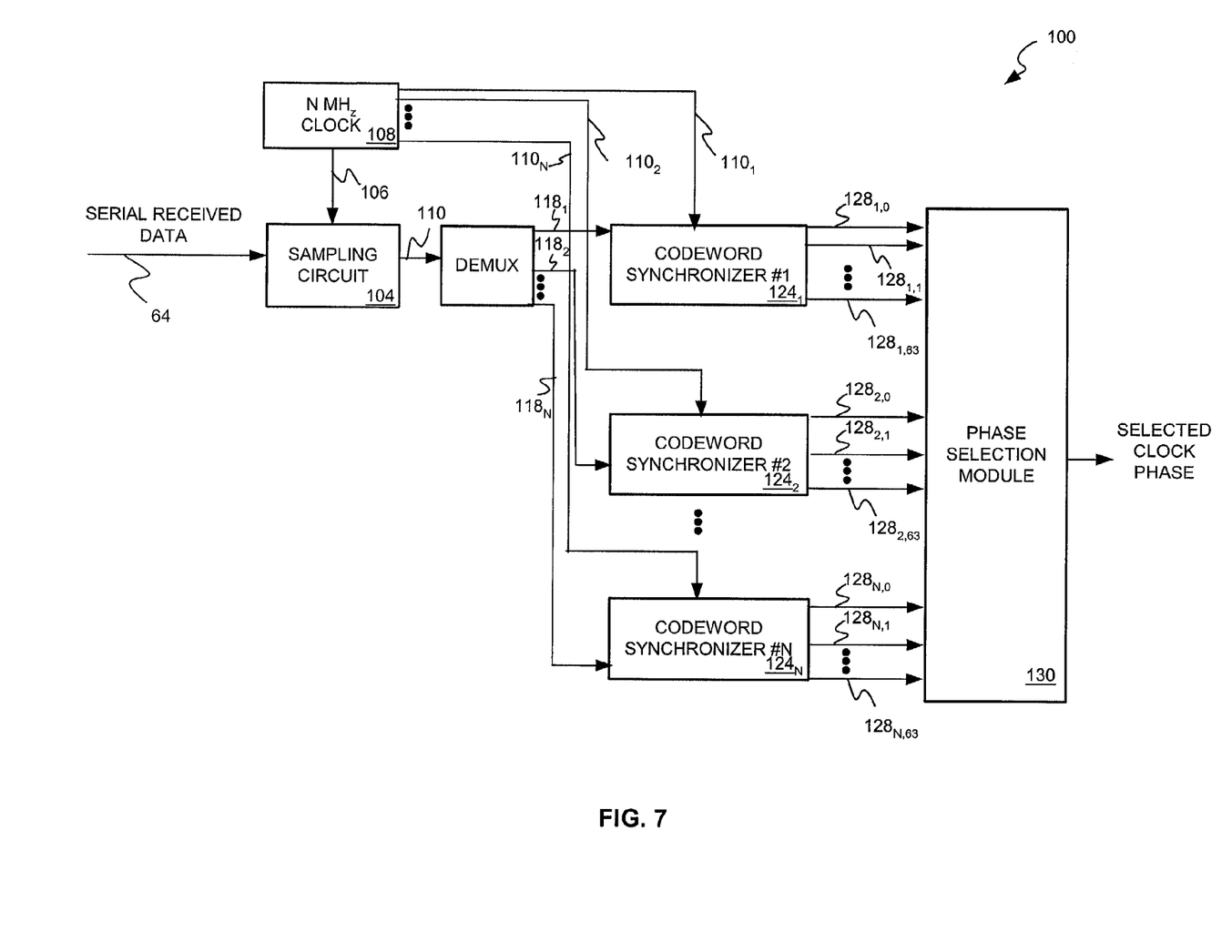
FIG. 7 is a block diagram representative of a codeword synchronization system operative to concurrently effect clock recovery and codeword synchronization.

In FIG. 7, the synchronization system 100 includes a sampling circuit 104 disposed to process packet data serially received at an exemplary data rate of 1 Mbps from wireless adapter card 54 via system bus 64. The sampling circuit 104 is clocked by a clock signal 106 provided by a free-running clock 108 at a rate of N×1 MHz, where N is greater than or equal to 2. Accordingly, sampling circuit 104 produces a sampled data stream 110 at an exemplary data rate of N×1 Mbps. That is, the sampled data stream 110 produced by the sampling circuit 104 includes N data samples of arbitrary phase relative to each cycle of the serial received data. The successive sets of N data samples corresponding to each successive cycle of the serial received data are demultiplexed by a demultiplexer 114 into N bit streams 118 at the exemplary rate of 1 Mbps. That is, each of the N bit streams includes only data obtained during sampling at a corresponding one of the N arbitrary sampling phases. Each bit stream 118 is provided to a separate codeword synchronization module 124, each of which provides a set of order of ELP indications 128 to a phase selection module 130. Each codeword synchronization module 124 is clocked by a LMHz clock signal 110 in phase with the one of the N arbitrary sampling phases associated with the bit stream 118 received thereby.

Figure 8:
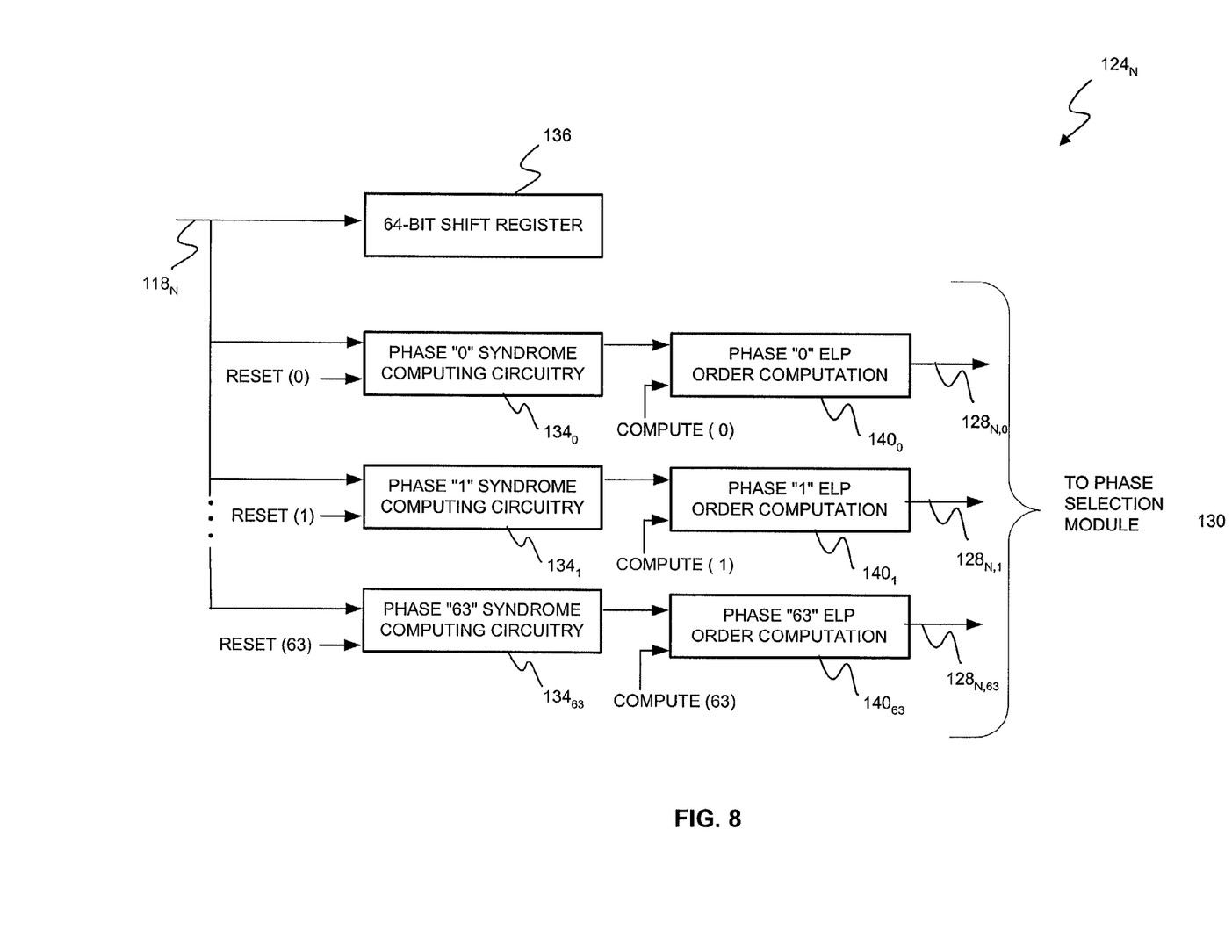
FIG. 8 depicts in block diagram form an exemplary codeword synchronization module included within the codeword synchronization system of FIG. 7.

FIG. 8 depicts in block diagram form the $N^{th}$ codeword synchronization module 124$_N$, which is substantially identical in structure to the other codeword synchronization modules 124. As shown, the Nth bitstream 118$_N$ is provided to each of a set of sixty four phase syndrome computing circuits 134 and to a 64-bit shift register 136. Each phase syndrome computing circuit 134 computes a set of syndromes once every sixty four cycles of the clock signal 110$_N$ provided to module 124$_N$ by the free-running clock 108. The sixty four phase syndrome computing circuits 134 and a corresponding set of sixty four order of ELP computation circuits 140 are enabled and clocked in a manner substantially identical to that described above with reference to FIGS. 3–5. Accordingly, during any given cycle of the clock corresponding to the bitstream 118$_N$, only one computation circuit 140 will be enabled and thus capable of providing an indication 128 of the order of the ELP of the 64 bits currently within the shift register 136. As discussed above, this order of the ELP will be less than 7 when a valid or correctable Bluetooth sync word is present within the shift register 136.

In accordance with the invention, when the last bit of a valid or correctable Bluetooth sync word is presented to each of the codeword synchronization modules 124, at least one computation circuit 140 within one or more of the synchronization modules 124 will provide an indication 128 of an order of ELP of less than 7. When this occurs, the phase selection module 130 determines the lowest such indication 128, and identifies the 64 bits within the associated shift register 136 as a valid or correctable Bluetooth sync word. In addition, the clock phase associated with the computation circuit 140 providing the lowest indication 128 is identified as the correct recovered clock phase for the data received over the bus 64. This recovered clock phase is then used to receive any serial data subsequently provided by bus 64. In this way the system 100 is operative to recover the clock phase of the serially received data during the process of identifying a valid or correctable Bluetooth sync word.

Accordingly, phase synchronizer operative to establish synchronization with the phase of a received codeword has been described herein. The phase synchronizer advantageously enables timing and device address information to be derived from the sync word within Bluetooth or other message packets without advance knowledge of the access code and prior to correction of any errors within the sync word. If desired, the phase synchronizer may be implemented so as to effect recovery of the clock phase of the serially received data during the process of identifying a valid or correctable sync word.

Although the above application has been described primarily with reference to specific embodiments, one skilled in the art can readily appreciate that the teachings of the present invention may be applied in other communication contexts. Thus the application is meant only to be limited by the scope of the appended claims.

What is claimed is:

1. A phase synchronizer comprising:
   an input shift register for receiving a sequence of bits comprising a codeword;
   a first syndrome computing module, operatively coupled to said input shift register, for computing first syndromes relating to a first potential phase of said codeword;
   a first error detection module for determining, based upon said first syndromes, a first number of errors associated with said first potential phase of said codeword;
   a second syndrome computing module, operatively coupled to said input shift register, for computing second syndromes relating to a second potential phase of said codeword;
   a second error detection module for determining, based upon said second syndromes, a second number of errors associated with said second potential phase of said codeword; and
   a comparator arrangement for comparing said first number of errors and said second number of errors to a threshold value, said first potential phase corresponding to a valid codeword phase when said first number of errors is less than said threshold value and said second potential phase corresponding to a valid codeword phase when said second number of errors is less than said threshold value.

2. The phase synchronizer of claim 1 wherein said first error detection module generates an error location polynomial using said first syndromes, said error location polynomial being of an order corresponding to said first number of errors.

3. A codeword synchronization module comprising:
   an input shift register for receiving a sequence of bits comprising a codeword;
   a plurality of phase synchronizers associated with a corresponding plurality of potential phases of said codeword, each of said phase synchronizers producing a codeword valid signal upon determining that said input shift register includes a set of said bits corresponding to said codeword; and
   a comparator coupled to said plurality of phase synchronizers to determine whether any of said phase synchronizers produce a codeword valid signal,
   wherein a first of said phase synchronizers produces a codeword valid signal upon determining that a number of errors within an associated one of said potential phases of said codeword is less than a predefined threshold, said first of said phase synchronizers including:
   a syndrome computing module; and
   an error detection module, said error detection module determining a first number of errors associated with a first of said plurality of potential phases of said codeword using syndromes produced by said syndrome computing module.

4. The codeword synchronization module of claim 3 wherein said syndrome computing module is reset in accordance with said first of said plurality of potential phases.

5. The codeword synchronization module of claim 4 wherein said error detection module is actuated prior to resetting of said syndrome computing module.

6. The codeword synchronization module of claim 3 wherein said first of said phase synchronizers includes a comparator coupled to said error detection module, said comparator producing one of said codeword valid signals when said first number of errors is less than said predefined threshold.

7. The codeword synchronization module of claim 3 wherein said error detection module generates an error location polynomial using syndromes produced by said syndrome computing module and wherein an order of said error location polynomial corresponds to said first number of errors.

8. The codeword synchronization module of claim 3 further including an error correction circuit for carrying out an error correction operation on said codeword using error correction information provided by said plurality of phase synchronizers.

9. A method of codeword synchronization comprising:
computing first syndromes relating to a first potential phase of a received codeword;
determining, based upon said first syndromes, a first number of errors associated with said first potential phase of said codeword;
computing second syndromes relating to a second potential phase of said codeword;
determining, based upon said second syndromes, a second number of errors associated with said second potential phase of said codeword; and
comparing said first number of errors and said second number of errors to a threshold value, said first potential phase corresponding to a valid codeword phase when said first number of errors is less than said threshold value and said second potential phase corresponding to a valid codeword phase when said second number of errors is less than said threshold value.

10. The method of codeword synchronization of claim 9 wherein said determining said first number of errors includes generating an error location polynomial using said first syndromes, said error location polynomial being of an order corresponding to said first number of errors.

11. The method of codeword synchronization of claim 9 further including carrying out an error correction operation on said codeword on the basis of an error location polynomial derived from said first syndromes.

12. A method of codeword synchronization comprising:
receiving a sequence of bits comprising a codeword;
computing a plurality of sets of syndromes, each set of syndromes being associated with a potential phase of said codeword;
identifying a number of errors associated with each said potential phase of said codeword using the one of said sets of syndromes associated with each said potential phase; and
determining whether a number of errors associated with any of said potential phases is less than a predetermined threshold.

13. The method of codeword synchronization of claim 11 wherein said identifying includes generating an error location polynomial corresponding to a first of said potential phases using a first of said sets of syndromes wherein an order of said first error location polynomial corresponds to a first number of errors associated with said first of said potential phases.

14. A data receiving apparatus for receiving data packets, each of said data packets being identified by an access code, said apparatus comprising:
an input shift register for receiving a sequence of bits comprising a codeword, said codeword corresponding to one of said access codes; and
a plurality of codeword detection modules associated with a corresponding plurality of potential phases of said codeword, each of said codeword detection modules generating a codeword valid signal when a number of errors associated with an associated one of said potential phases is less than a predetermined threshold.

15. The data receiving apparatus of claim 14 further including an error correction circuit for carrying out an error correction operation on said codeword using error correction information provided by ones of said codeword detection modules generating codeword valid signals.

16. The data receiving apparatus of claim 15 wherein each of said codeword detection modules is operative to compute a predefined number of syndromes of a different one of said plurality of potential phases of said codeword.

17. The data receiving apparatus of claim 16 wherein said error correction uses said predefined number of syndromes from a first of said codeword detection modules to determine one or more bit positions of erroneous bits within said sequence of bits and to correct said erroneous bits.

18. The data receiving apparatus of claim 16 wherein each of said codeword detection modules includes:
a syndrome computing module for computing syndromes of said codeword;
an error detection module for determining, based upon said syndromes, a number of errors within said codeword; and
a comparator for comparing said number of errors to a threshold value, said codeword corresponding to a valid codeword when said number of errors is less than said threshold value.

19. A codeword synchronization system comprising:
a sampling arrangement for generating N bitstreams in response to a received data stream, where N is an integer;
a set of N codeword synchronization modules, each of said N codeword synchronization modules providing a plurality of codeword error signals indicative of a number of errors associated with a corresponding plurality of potential phases of one of said N bitstreams; and
a phase selection module for identifying one of said codeword error signals as being indicative of a lowest number of errors.

20. The codeword synchronization system of claim 19 wherein a first of said set of N codeword synchronization modules includes:
an input shift register for receiving a first of said N bitstreams, said first of said N bitstreams containing a codeword, and
a plurality of syndrome computing modules, each of said syndrome computing modules computing syndromes being associated with a different one of said plurality of potential phases of said codeword.

21. The codeword synchronization system of claim 20 wherein said first of said set of N codeword synchronization modules further includes a plurality of error detection modules, each of said error detection modules determining a number of errors associated with a corresponding one said plurality of potential phases of said codeword using the syndromes produced by an associated one of said plurality of syndrome computing modules.

22. The codeword synchronization system of claim 19 wherein said sampling arrangement includes:
a sampling circuit; and
a clock coupled to said sampling circuit, said clock being operative at N times a data rate of said received data stream.

23. The codeword synchronization system of claim 22 wherein said sampling arrangement further includes a demultiplexer having an input port connected to said sampling circuit and a set of N output ports connected to said set of N codeword synchronization modules.

* * * * *